US006472640B2

(12) United States Patent
Brown et al.

(10) Patent No.: US 6,472,640 B2
(45) Date of Patent: Oct. 29, 2002

(54) PREHEAT SYSTEM FOR CONVECTION COOKING APPLIANCE

(75) Inventors: John Scott Brown, Charleston, TN (US); Marcus Moore, Knoxville, TN (US); Robert Z. Whipple, Jr., Louden, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/058,323

(22) Filed: Jan. 30, 2002

(65) Prior Publication Data

US 2002/0066724 A1 Jun. 6, 2002

Related U.S. Application Data

(63) Continuation-in-part of application No. 09/902,655, filed on Jul. 12, 2001, which is a continuation of application No. 09/650,417, filed on Aug. 29, 2000, now Pat. No. 6,291,808.

(60) Provisional application No. 60/153,224, filed on Sep. 13, 1999.

(51) Int. Cl.[7] .............................. H05B 6/80; A21B 1/26

(52) U.S. Cl. ....................... 219/400; 219/412; 219/681; 126/21 A

(58) Field of Search ................................ 219/681, 685, 219/757, 400, 401, 396, 412; 126/21 A, 275 E

(56) References Cited

U.S. PATENT DOCUMENTS

| | | |
|---|---|---|
| 3,327,094 A | 6/1967 | Martin et al. |
| 3,353,004 A | 11/1967 | Alexander |
| 3,521,032 A | 7/1970 | Heuss |
| 4,154,861 A | 5/1979 | Smith |
| 4,327,279 A | 4/1982 | Guibert |
| 4,397,875 A | 8/1983 | Gilliom |
| 4,455,478 A | 6/1984 | Guibert |

(List continued on next page.)

FOREIGN PATENT DOCUMENTS

| | | | | |
|---|---|---|---|---|
| DE | 39 31 482 | | 4/1991 | |
| JP | 3-144219 | | 6/1991 | |
| JP | 5-157252 | * | 6/1993 | ................. 219/553 |

*Primary Examiner*—Philip H. Leung
(74) *Attorney, Agent, or Firm*—Diederiks & Whitelaw, PLC

(57) ABSTRACT

A preheat system for a convection cooking appliance functions to control the operation of multiple heating units, the heating of a catalyst, and the speed of a blower assembly of the appliance to effectively eliminate grease, oils, and other hydrocarbon compounds from prior cooking operations, while also minimizing the generation of any appreciable amount of smoke. Additionally, the blower assembly is controlled to establish a negative pressure differential in the oven cavity upon opening of an oven door in order to assure that any smoke, as well as additional amount of oxygen for enhancing combustion, will be drawn into the oven cavity. The preheat system is particularly adapted to clean the oven cavity prior to a cooking operation and between self-cleaning cycles.

17 Claims, 4 Drawing Sheets

U.S. PATENT DOCUMENTS

| | | | | |
|---|---|---|---|---|
| 4,480,164 | A | | 10/1984 | Dills |
| 4,481,404 | A | | 11/1984 | Thomas et al. |
| 4,503,760 | A | | 3/1985 | Pryputsch et al. |
| 4,545,360 | A | * | 10/1985 | Smith et al. .................. 126/76 |
| 4,547,642 | A | | 10/1985 | Smith |
| 4,654,508 | A | | 3/1987 | Logel et al. |
| 4,796,600 | A | | 1/1989 | Hurley et al. |
| 4,827,106 | A | | 5/1989 | Margraf |
| 4,940,869 | A | | 7/1990 | Scholtes et al. |
| 5,006,851 | A | | 4/1991 | Kaneaki et al. |
| 5,089,679 | A | | 2/1992 | Eke |
| 5,107,126 | A | | 4/1992 | Yano |
| 5,339,726 | A | | 8/1994 | Poulson |
| 5,387,258 | A | | 2/1995 | Puricelli |
| 5,615,603 | A | | 4/1997 | Polin |
| 5,662,029 | A | | 9/1997 | Ubert et al. |
| 5,695,668 | A | | 12/1997 | Boddy |
| 5,717,192 | A | | 2/1998 | Dobie et al. |
| 5,780,815 | A | | 7/1998 | Mestnik et al. |
| 5,927,265 | A | | 7/1999 | McKee et al. |
| 5,994,672 | A | | 11/1999 | Mestnik |
| 6,058,924 | A | | 5/2000 | Pool, III et al. |
| 6,060,701 | A | | 5/2000 | McKee et al. |
| 6,291,808 | B1 | | 9/2001 | Brown |
| 6,316,749 | B1 | * | 11/2001 | Bales et al. ................. 219/400 |

* cited by examiner

PREHEAT SYSTEM FOR CONVECTION COOKING APPLIANCE

CROSS-REFERENCE TO RELATED APPLICATIONS

The present application represents a continuation-in-part of U.S. patent application Ser. No. 09/902,655 filed Jul. 12, 2001, pending, which is a continuation of U.S. patent application Ser. No. 09/650,417 filed Aug. 29, 2000, now U.S. Pat. No. 6,291,808 issued on Sep. 18, 2001, which claims the benefit of U.S. Provisional Patent Application Ser. No. 60/153,224, filed Sep. 13, 1999.

BACKGROUND OF THE INVENTION

1. Field of the Invention

The present invention pertains to the art of cooking appliances and, more particularly, to a preheat system employed to eliminate byproducts from an oven cavity between cleaning cycles in a convection cooking appliance.

2. Discussion of the Prior Art

Conventional cooking appliances generally perform cooking operations through radiant heating developed from bake and/or broil elements. Such types of cooking appliances can take various forms, mainly ranges and wall ovens. When utilizing a conventional cooking appliance, the oven is initially controlled to proceed through a preheat cycle wherein both the bake and broil elements are actuated in order to reach a desired cooking temperature. Often times, a signal is provided to a user when the preheat cycle is complete in order to indicate when the food to be cooked can be placed in the oven. During these preheat operations, retained grease, oils, other hydrocarbon compounds or the like, herein collectively referred to as byproducts, contained in the oven cavity from prior cooking operations will be, at least partially, burnt which can create smoke and byproduct laden air.

Certain known types of cooking appliances incorporate internal fans which operate during certain cooking periods. Therefore, these known cooking appliances can perform convection cooking operations. Convection cooking is actually more prevalent in microwave and other types of ovens which do not require preheating. However, utilizing convection heating in a cooking appliance including more conventional elements used to perform preheat and cooking operations is also known. In these types of cooking appliances, the convection air flow can actually increase the negative effects of any smoke and byproduct containing air, particularly in situations where a door of the oven cavity being preheated is opened.

To at least address the concerns raised above, there exists a need in the art of cooking appliances, specifically convection cooking appliances, for a more effective preheating system whereby retained greases, oils, other hydrocarbon compounds, and the like remaining from prior cooking operations can be effectively eliminated, while minimizing any negative effects of developed smoke and other airborne byproducts.

SUMMARY OF THE INVENTION

In accordance with the invention, a preheat system for a convection cooking appliance functions to control the operation of multiple heating units, the heating of a catalyst, and the speed of a blower assembly of the appliance to effectively eliminate grease, oils, and other hydrocarbon compounds remaining from prior cooking operations, while minimizing is the generation of any appreciable amount of smoke, between successive self-cleaning operations. In accordance with a preferred embodiment of the invention, at least one of the heating units is energized, preferably at full power, and the blower assembly is run at a low to moderate speed when a cooking operation is selected. Once the catalyst reaches a critical temperature, e.g., 450° F., another one of the heating unit is initiated under full power and/or 100% duty cycle.

At this point, the grease, oils, other hydrocarbons, and the like byproducts remaining from prior cooking operations will begin combusting, thereby generating some smoke, a majority of which is forced out through the catalyst. Because the catalyst has been sufficiently heated, the fats, oils and other hydrocarbons can be completely combusted and converted to carbon dioxide and water with very little or no smoke. As the catalyst reaches a critical firing temperature, additional combustion of the grease, oils and other hydrocarbons will commence. Therefore, in this manner, the combustion of the remaining byproducts is performed in various, controlled stages. At this point, the speed of the blower assembly is increased to draw additional oxygen into the oven cavity in order to maintain an oxidizing atmosphere.

Additionally, if a door for oven cavity is opened during the cycle, the blower assembly remains ON, but is controlled to operate at a lower speed, preferably in the order of 20%, to create air circulation in the oven cavity. In this manner, the blower assembly creates a negative pressure differential in the oven cavity such that any smoke will be drawn back into the oven cavity, instead of being released into the ambient atmosphere. In addition, the creation of the pressure differential actually functions to draw in more oxygen so as to enable even further combustion.

Additional objects, features and advantages of the present invention will become readily apparent from the following detailed description of a preferred embodiment thereof, when taken in conjunction with the drawings wherein like reference numerals refer to corresponding parts in the several views.

DETAILED DESCRIPTION OF THE INVENTION

Figure 1:
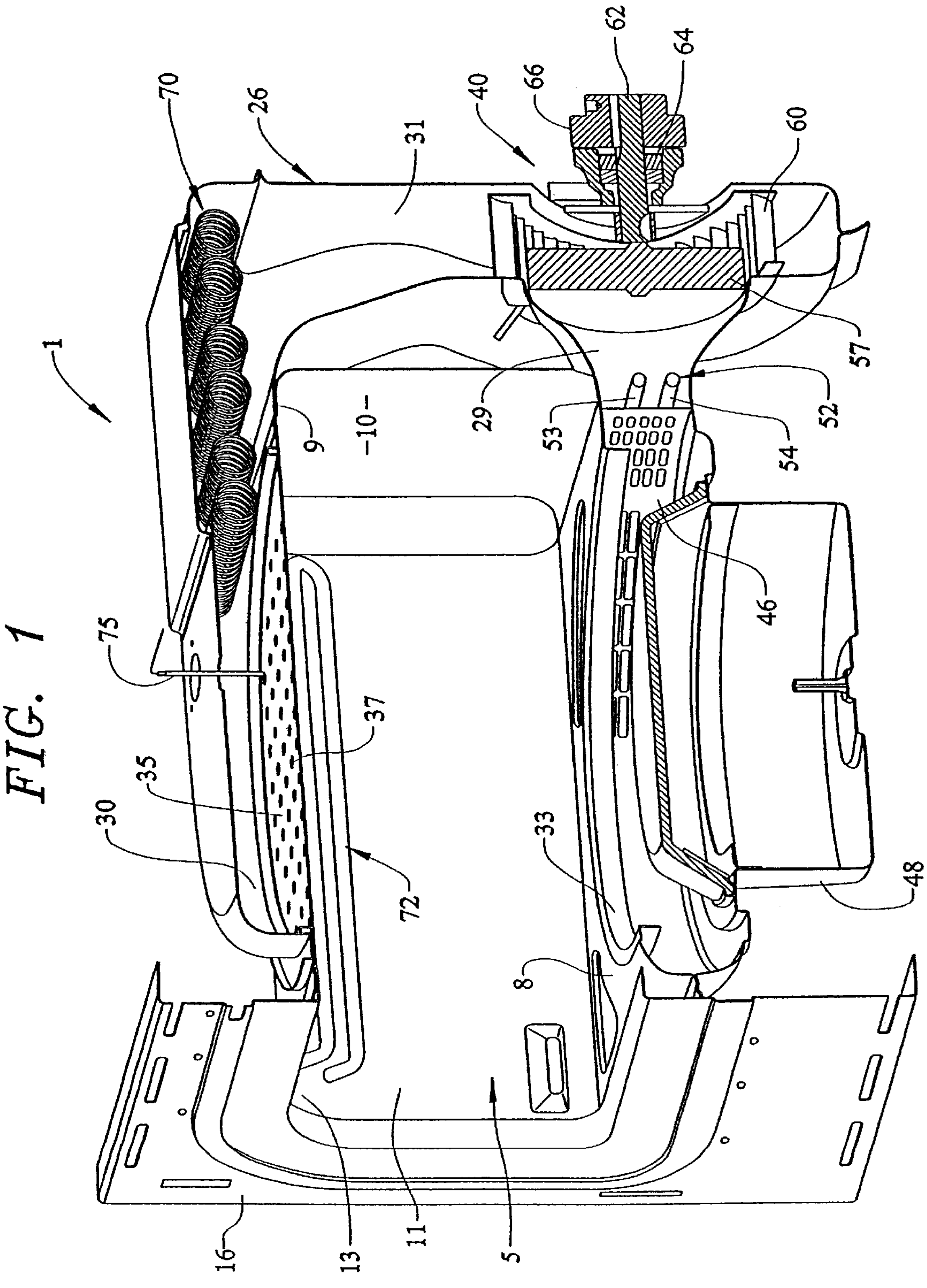
FIG. 1 is a perspective, partial sectional view of a convection cooking appliance constructed in accordance with the present invention.
Figure 2:
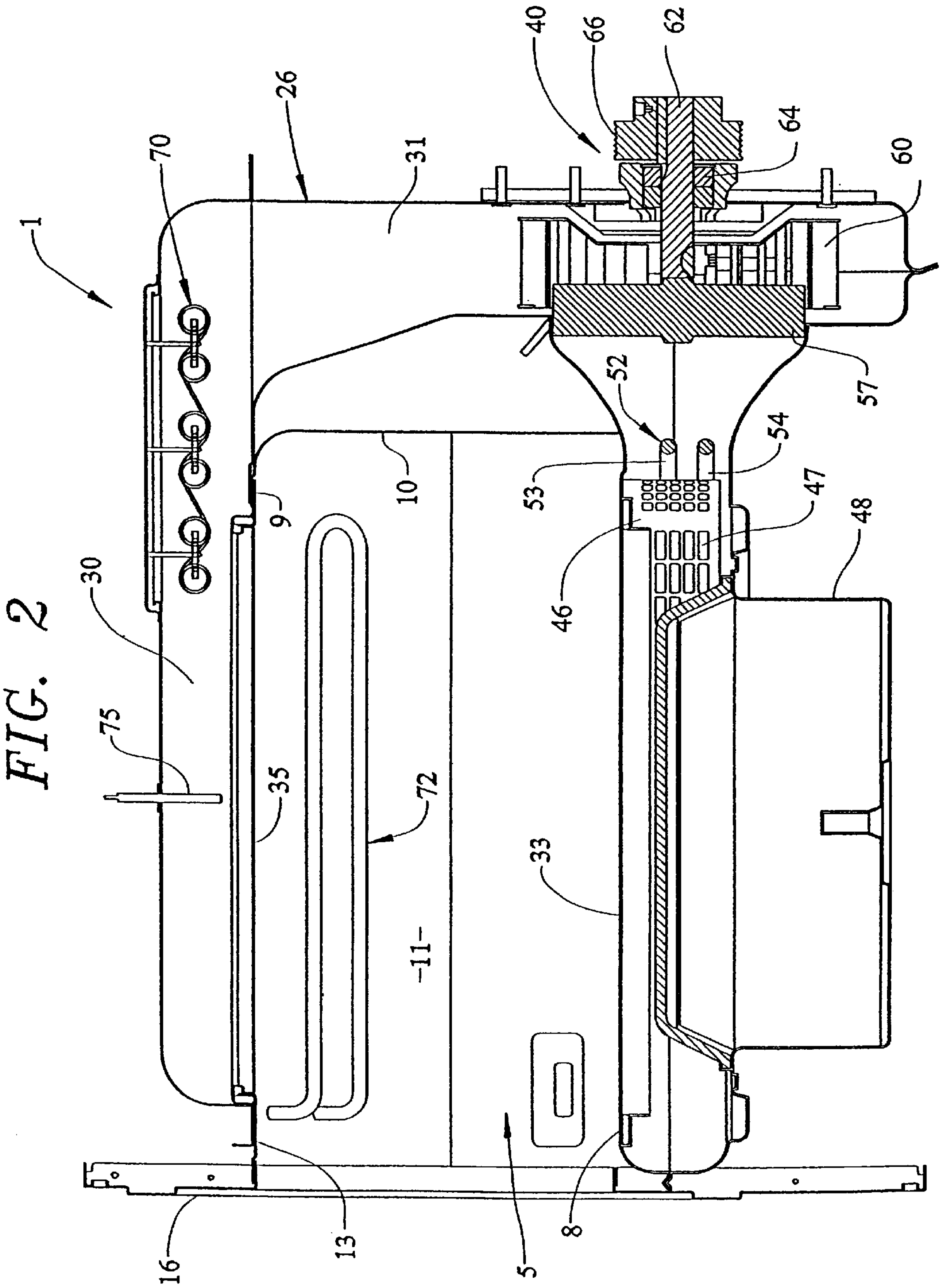
FIG. 2 is a cross-sectional side view of the cooking appliance of FIG. 1.
Figure 3:
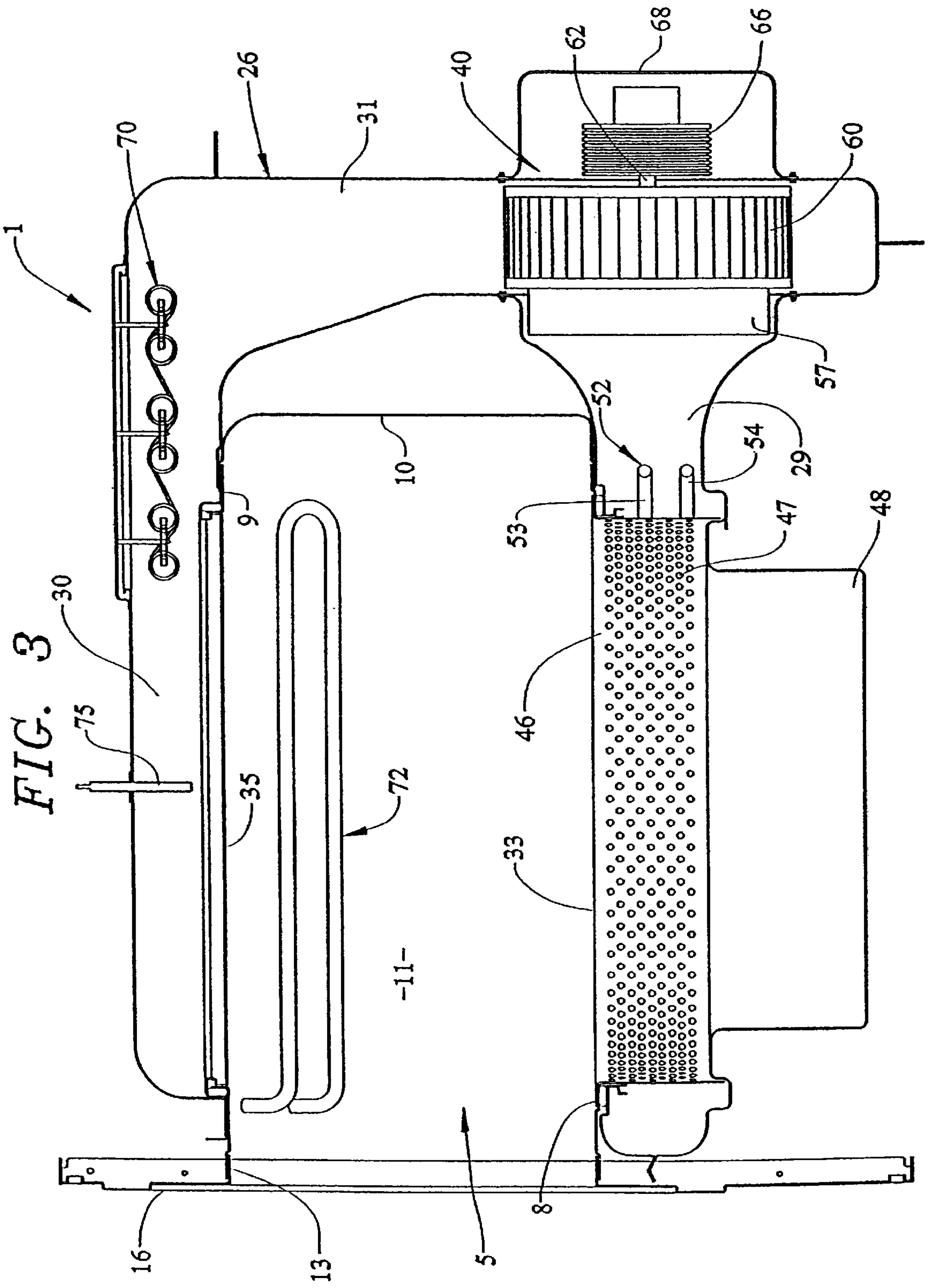
FIG. 3 is a schematic side view, similar to that of FIG. 2, of the cooking appliance.

With initial reference to FIGS. 1—3, a cooking appliance I is schematically shown in the form of a wall oven. Appliance 1 includes an oven cavity 5 generally defined by a bottom wall 8, a top wall 9, a rear wall 10 and a pair of side walls, one of which is indicated at 11. Oven cavity 5 also has associated therewith an access opening 13 for food items to be placed into or withdrawn from cavity 5. About access opening 13 is provided a frontal plate 16. In a manner known in the art, frontal plate 16 is adapted to be mounted against a substantially vertical wall such as in the kitchen of a residential home, and would have a door (not shown) pivotally attached thereto for selectively sealing off access opening 13.

Extending generally along top, bottom and rear portions of cavity 5 is an air channel assembly 26 defined by ducting that leads into and out of cavity 5. More specifically, air channel assembly 26 includes a lower air return section 29, an upper air delivery section 30 and a rear air transfer section 31. Lower air return section 29 is open into cavity 5 through a substantially central return air outlet 33 formed in bottom 8. In the most preferred form of the invention, return air outlet 33 is constituted by a generally circular insert provided with various spaced holes (not shown). In a similar manner, upper air delivery section 30 includes a discharge or delivery inlet 35 formed in top wall 9. Although only partially shown in FIG. 1, inlet 35 is also preferably constituted by a generally circular-shaped insert which is attached to the remainder of upper air delivery section 30 and which is provided with a plurality of holes 37.

As will become more fully evident below, the particular construction of cooking appliance 1 can significantly vary in accordance with the present invention. More specifically, it is only important in accordance with the present invention that cooking appliance 1 include an air channel assembly, such as that discussed above with reference to assembly 26, as well as a blower assembly, such as that generally indicated at 40, for use in generating a circulating flow of air through oven cavity 5. Although not considered a part of the present invention, a preferred construction for oven cavity 5 and air channel assembly 26 can be found in U.S. patent application Ser. No. 09/649,957 entitled "OVEN CAVITY CONSTRUCTION" filed on Aug. 29, 2000 which is hereby incorporated by reference.

In the preferred embodiment shown, cooking appliance 1 constitutes an electric appliance and, more specifically, a combination convection, microwave and radiant cooking device. As shown in this figure, cooking appliance 1 is provided with an annular filter basket 46, having a multitude of circumferentially spaced holes 47, which is positioned within lower air return section 29 and through which the air flowing from cavity 5 through return air outlet 33 is directed. Arranged below filter basket 46 is a microwave generator unit 48 incorporating a magnetron and mode stirrer (both not specifically shown).

Encircling at least a portion of filter basket 46 is a first electric heating element 52. Heating unit 52 is shown as constituted by a sheathed electric resistance heating element having upper and lower interconnected legs 53 and 54. First electric heating unit 52 is preferably provided to heat return air flowing from oven cavity 5, through outlet 33 and filter basket 56 prior to the air reaching a catalyst indicated at 57. In a manner known in the art, catalyst 57 functions to eliminate smoke and the like from the air stream. As shown, catalyst 57 extends partially within a rotatable blower element 60 which forms part of blower assembly 40. Although blower element 60 can take various forms while performing the desired air flow generating function, blower element 60 preferably constitutes a centrifugal unit arranged at the juncture of lower air return section 29 and rear air transfer section 31. In general, blower element 60 is secured to a shaft member 62 that is rotatably mounted through a bearing assembly 64. Shaft member 62 also has attached thereto, for non-relative rotation, a sheave 66 which is adapted to receive a belt (not shown) for use in rotating blower element 60 through shaft member 62 in combination with a variable speed electric motor (also not shown). As illustrated, sheave 66 is preferably arranged within a housing extension 68 which projects from rear air transfer section 31.

Preferably mounted in upper air delivery section 30 adjacent rear transfer section 31 is a second electric heating element arrangement 70 that is preferably constituted by a bank of open heating coils. Most preferably, second heating unit 70 is defined by a single open electric coil arranged in multiple rows, with each row running back and forth across essentially the entire width of upper air delivery section 30 so as to be substantially perpendicular to the direction of flow through upper air delivery section 30. In any event, second heating unit 70 functions to further heat the air flowing through channel assembly 26 prior to the air reaching discharge inlet 35 as will be more fully discussed below.

Also shown in this figure is a third electric heating unit 72 which, in a manner similar to first electric heating unit 52, is preferably constituted by a sheathed, resistance-type heating element. Third electric heating unit 72 preferably extends adjacent top wall 9 and constitutes an additional heat source for cavity 5 of cooking appliance 1. The particular manner in which first, second and third electric heating units 52, 70 and 72 are utilized during operation of cooking appliance 1 for a cleaning mode of operation is detailed in U.S. patent application Ser. No. 09/650,416 entitled "SELF-CLEANING SYSTEM FOR A COOKING APPLIANCE" filed Aug. 29, 2000 which is hereby incorporated by reference.

Figure 4:
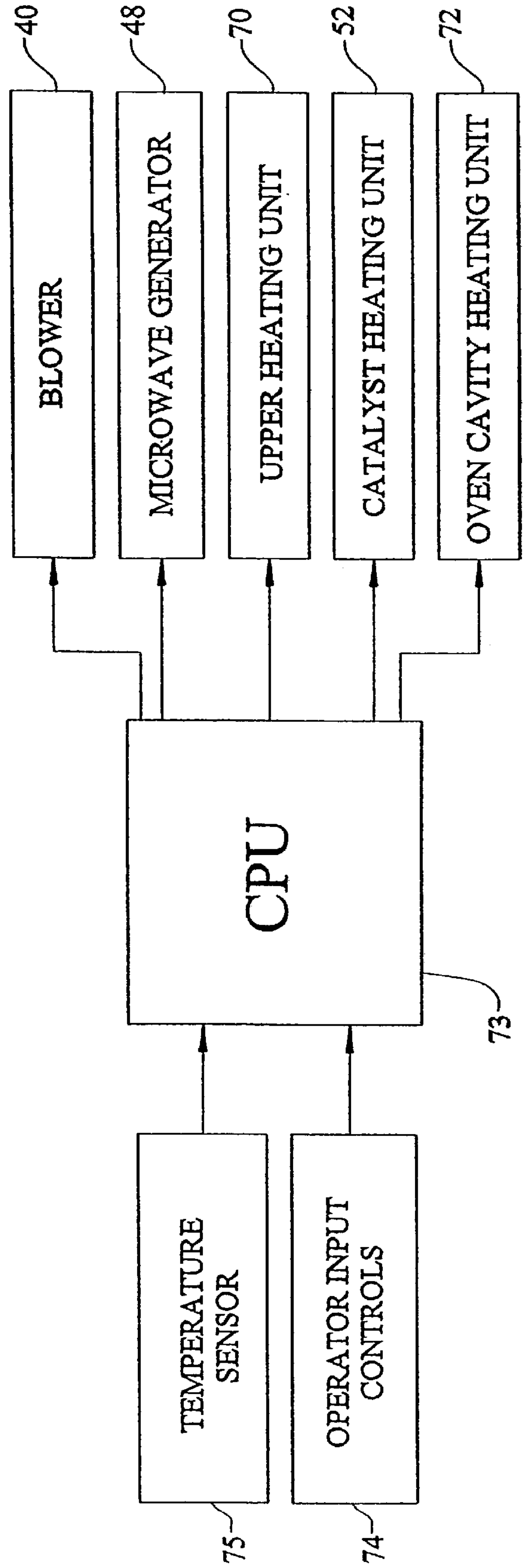
FIG. 4 is a block diagram illustrating a control arrangement used in the convection cooking appliance of the invention.

As represented in FIG. 4, each of blower assembly 40, microwave generator 48 and first, second and third electric heating units 52, 70 and 72 are linked to an appliance controller or CPU 73 and regulated based on established operator settings input at 74, as well as signals received from a temperature sensor 75. The present invention is particularly directed to the manner in which cooking appliance 1 is efficiently and effectively preheated prior to being operated in various modes and between self-cleaning operations. Prior to fully describing the preheat system according to the invention, a general discussion of the operation of cooking appliance 1 will be provided.

First of all, a user of cooking appliance 1 can select, through operator input controls 74, a convection cooking mode wherein heating element 52 is activated, along with blower assembly 40 and heating unit 70, to direct a flow of recirculating air through oven cavity 5. With this arrangement, heated air will be caused to flow within air channel assembly 26 and through holes 37 in order to impinge on food items to be cooked within oven cavity 5. During operation, blower assembly 40 can produce a certain degree of turbulence which is considered detrimental to the uniform and consistent flow of air through channel assembly 26. However, as indicated above, heating unit 70 is preferably constituted by various rows of open coils, with six rows of coils being shown in the preferred embodiment depicted in the drawings. Since the coils are open and arranged perpendicular to the flow of air, any turbulence developed by the operation of blower assembly 40 is transformed into a linear or laminar flow which enhances a smooth and continuous flow through oven cavity 5 for uniform heating.

During a convection cooking mode of operation, heating unit 70 can be cycled on and off by controller 73 in dependence on the temperature of the air as signaled by sensor 75. Within the spirit of the invention, heating unit 70 can also be variably controlled, such as by establishing low, medium or high wattage settings. For purposes of the invention, reference will be made to heating unit 70 and/or heating unit 52 being operable at varying power levels which is intended to encompass various ways in which the heating capacity of each of these units can be altered, e.g. through varying duty cycles and/or wattage settings.

Although not shown, heating unit 70 is preferably, electrically linked to controller 73 through the use of a triac. Regardless of the particular operating status of heating unit 70, blower assembly 40 and heating unit 52 are operated continuously throughout the convection cooking mode in accordance with the most preferred embodiment of the invention.

The user of cooking appliance 1 can also select a microwave cooking mode wherein controller 73 activates generator 48. Again, heating unit 52 is preferably, continuously operated whenever cooking appliance 1 is operating in a cooking mode. Furthermore, in a cleaning mode, each of heating units 52, 70 and 72 are controlled for effective high temperature operation as covered by the patent application referenced above.

In accordance with the preheating system of the present invention, upon initial activation of cooking appliance 1 for a convection cooking operation, controller 73 energizes heating unit 70, preferably at full power, and blower assembly 40 is run at a low to moderate speed. Once catalyst 57 reaches a critical temperature, e.g., 450° F., heating unit 52 is initiated under full power, i.e., a high wattage setting and/or 100% duty cycle. At this point, the greases, oils, other hydrocarbons, and the like byproducts remaining from prior cooking operations will begin combusting, thereby generating some smoke, a majority of which is forced out through catalyst 57. Because catalyst 57 has been sufficiently heated, the fats, oils and other hydrocarbons can be completely combusted and converted to carbon dioxide and water with very little or no smoke. As catalyst 57 reaches a critical firing temperature, additional combustion of the grease, oils and other hydrocarbons will commence. Therefore, in this manner, the combustion of the remaining byproducts is performed in various, controlled stages. At this point, the speed of blower assembly 40 is increased to draw additional oxygen into air channel assembly 26 in order to maintain an oxidizing atmosphere.

Again, a main purpose of the preheat system of the invention is to clean oven cavity 5 prior to cooking and between self-cleaning operations. Additionally, if a door (not shown) adapted to extend across and substantially seal oven cavity 5 is opened during preheating, blower assembly 40 remains ON in accordance with the invention, but is controlled to operate at a lower speed, preferably in the order of 20%, to create a circulation in oven cavity 5. Blower assembly 40 actually operates to create a negative pressure differential in oven cavity 5 such that any smoke will be drawn back into oven cavity 5 and through catalyst 57, instead of being released into the ambient atmosphere. In addition, the creation of the pressure differential actually functions to draw in more oxygen so as to enable even further combustion.

Although described with respect to a preferred embodiment of the invention, it should be recognized that various changes and/or modifications can be made to the invention without departing from the spirit thereof. It should be recognized that employing the preheating system of the invention can produce enhanced, overall operating results for cooking appliance 1 in various modes of operation. However, it should also be recognized that, although the present invention has been described with reference for use in connection with cooking appliance 1, it should be readily apparent that the invention can also be applied to various types of convection cooking appliances, including ranges and other wall oven arrangements. In any event, the invention is only intended to be limited by the scope of the following claims.

We claim:

1. In a cooking appliance including an oven cavity adapted to be used in convection cooking of food products, a system for preheating the oven cavity comprising:

an air channel assembly extending about at least a portion of and being in fluid communication with the oven cavity;

a variable speed blower assembly for developing a flow of air within the air channel assembly for delivery to the oven cavity;

a catalyst arranged in the air channel assembly in fluid communication with the flow of air, said catalyst having a critical activation temperature;

a first heating unit for heating the flow of air at varying power levels including at least low and high power levels; and means for controlling at least the blower assembly and the first heating unit during a preheat operation for the cooking appliance, with said controlling means initially operating the first heating unit at a high power level, while running the blower assembly at a low speed, for the preheat operation.

2. The preheating system according to claim 1, wherein the first heating unit is positioned in the air channel assembly.

3. The preheating system according to claim 2, wherein the blower assembly is located between the catalyst and the first heating unit within the air channel assembly.

4. The preheating system according to claim 1, further comprising: a second heating unit arranged directly adjacent the catalyst within the air channel assembly, said controlling means activating the second heating unit when said catalyst reaches the critical activation temperature.

5. The preheating system according to claim 4, wherein the second heating unit is operable at varying power levels including at least low and high power levels, said second heating unit being operated at the high power level.

6. The preheating system according to claim 4, wherein the critical activation temperature is approximately 450° F.

7. The preheating system according to claim 4, wherein said controlling means operates the blower assembly at a higher speed after the catalyst reaches the critical activation temperature during the preheat operation.

8. The preheating system according to claim 1, wherein the oven cavity is adapted to be selectively accessed through a door of the cooking appliance, said controlling means operating the blower assembly at a reduced speed when the door is opened.

9. The preheating system according to claim 8, wherein the controlling means causes the blower assembly to operate at approximately 20% when the door is opened.

10. In a convection cooking appliance including an oven cavity, an air channel assembly in fluid communication with the oven cavity, a variable speed blower assembly for developing a flow of air directed through the air channel assembly and the oven cavity, first and second heating units each of which is operable at varying power levels including at least low and high power levels for heating the flow of air, and a catalyst having a critical activation temperature, a method of preheating the oven cavity comprising: initiating a partial combustion of any remaining cooking byproducts in the oven cavity and the air channel assembly by initially activating the first heating unit at a high power level and operating the blower assembly at a low speed.

11. The method of claim 10, further comprising: commencing a further combustion of remaining cooking byproducts by activating the second heating unit when the catalyst reaches the critical activation temperature.

12. The method of claim 11, further comprising: operating the second heating unit at the high power level when the catalyst reaches the critical activation temperature.

13. The method of claim 11, wherein the second heating unit is activated when the catalyst reaches approximately 450° F.

14. The method of claim 11, further comprising: increasing the speed of the blower assembly after the catalyst reaches the critical activation temperature during the preheat operation.

15. The method of claim 10, further comprising: operating the blower assembly at a reduced speed when a door, adapted to extend across and enable selective access to the oven cavity, is opened.

16. The method of claim 15, further comprising: operating the blower assembly at approximately 20% when the door is opened.

17. The method of claim 10, further comprising: creating a negative pressure differential in the oven cavity in order to draw oxygen into the oven cavity when a door, adapted to extend across and enable selective access to the oven cavity, is opened.

* * * * *